UNITED STATES PATENT OFFICE.

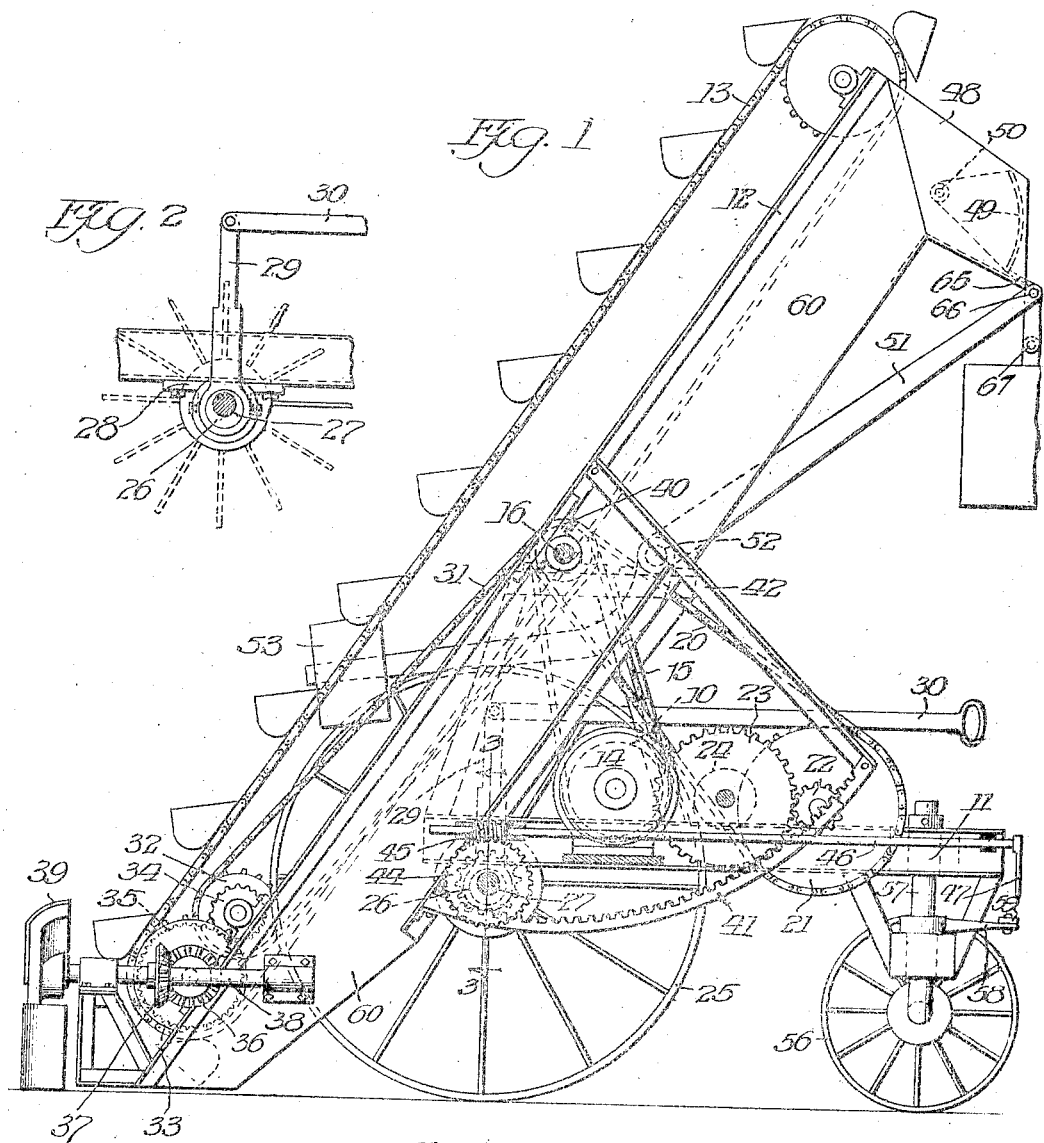

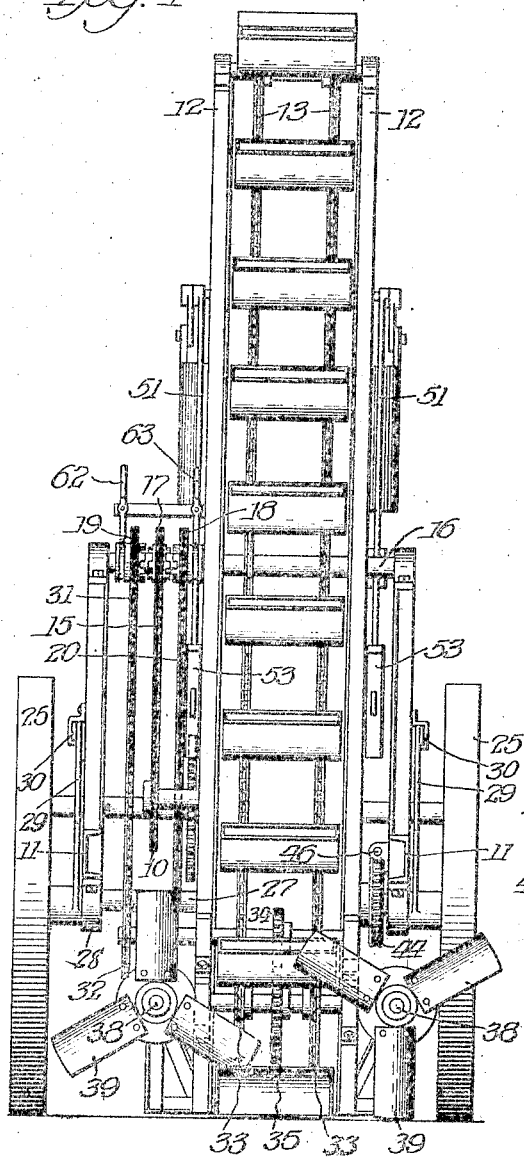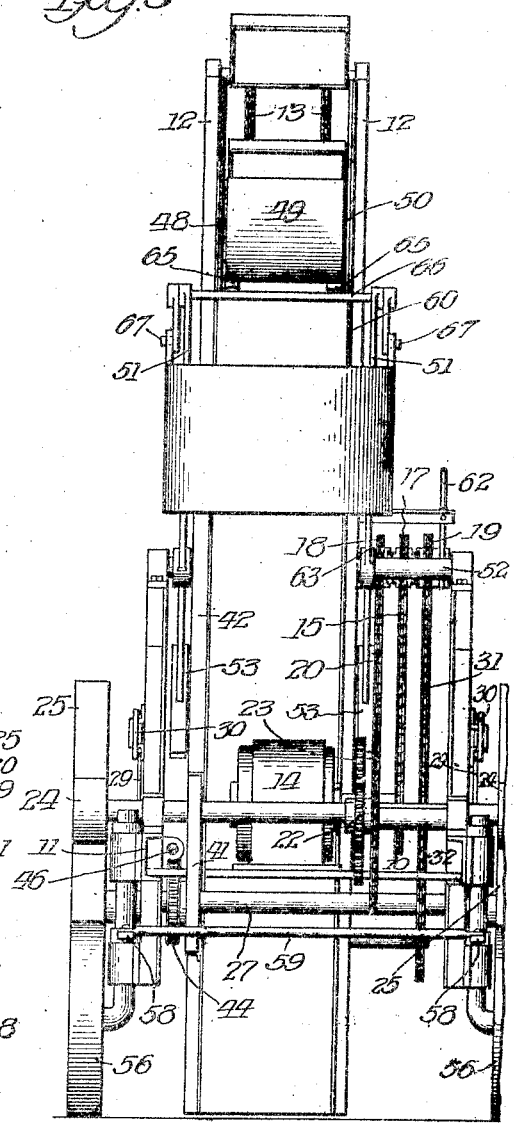

WILLIAM T. JAMES, OF CHICAGO, ILLINOIS.

WAGON-LOADING APPARATUS.

1,351,040.

Specification of Letters Patent.   Patented Aug. 31, 1920.

Application filed July 26, 1915, Serial No. 41,829.   Renewed December 11, 1918.   Serial No. 266,320½.

*To all whom it may concern:*

Be it known that I, WILLIAM THOMAS JAMES, a citizen of the United States, and a resident of Chicago, in the county of Cook and State of Illinois, have invented certain new and useful Improvements in Wagon-Loading Apparatus, of which the following is a specification.

My present invention relates to wagon loading apparatus, and more particularly apparatus of this kind adapted to lift material from the ground into a wagon by means of an endless conveyer.

The principal objects of my present invention are to provide means for bringing the material to be lifted toward the lower end of the conveyer from either side thereof; to provide means for cutting and breaking up the material to be lifted by the conveyer; to provide improved means for connecting the motor operating the apparatus to the various operative parts thereof; and generally, to improve, simplify and cheapen the construction of wagon loading apparatus of the kind set forth.

In attaining these and certain other objects and advantages to be hereinafter disclosed, I have provided a construction one embodiment of which is illustrated in the accompanying drawings, in which:—

Figure 1 is a side elevation, partly in section, of the apparatus as a whole;

Figure 2 is a detailed view of the journal of the axle carrying the traction wheels of the apparatus;

Fig. 3 is a section on the line 3—3 of Fig. 1;

Figs. 4 and 5 are, respectively, front and rear elevations of the apparatus as a whole.

The wagon loading apparatus illustrated in the drawings consists of a frame 11 which carries the frame 12 of the conveyer 13. A pivotal connection is provided between the frames 11 and 12 which will be subsequently described.

On the frame 11 is mounted a motor 14 preferably reversible by which the conveyer may be operated or the traction wheels of the apparatus rotated in order to move the apparatus as a whole along the ground. The motor 14 is provided with a sprocket 10 connected by a chain 15 to a sprocket 17 revolubly mounted on the shaft 16. The shaft 16 is the axis about which the conveyer 13 swings, so by placing the sprocket on the shaft 16 no special adjustments have to be made in the power transmission gear as a result of a change in position of the conveyer. This sprocket 17 is provided with clutch projections on both lateral faces, those on one face being adapted to engage with corresponding projections on the sprocket 18 and those on the other face with projections on the sprocket 19. Clutch operating levers 62 and 63 are provided for bringing either of the sprockets 18 or 19 into engagement with the sprocket 17.

The sprocket 18 is connected by means of a chain 20 to the sprocket 21 to which is rigidly connected a pinion 22 which engages the gear wheel 23. The last-mentioned gear wheel is rigidly connected to friction wheels 24 adapted to be brought into engagement with the tread surfaces of the traction wheels 25. In order to bring the wheels 24 and 25 into contact, provision is made for moving the wheels 25 relatively to the frame of the apparatus. The preferred method of producing the relative movement is shown more particularly in Fig. 2 and consists in providing an eccentric journal 26 for the axle 27 which carries the wheels 25. The eccentric 26 is itself arranged to turn in a journal 28, and the angular position of the eccentric relatively thereto can be varied by means of the arm 29 connected to the eccentric and the operating lever 30 pivotally connected to the end of the arm 29. It will be apparent that by pulling on the lever 30 the wheels 25 will be brought into frictional engagement with the wheels 24. As the motor 14 is reversible the wheels 25 can be driven in either direction at will.

The apparatus can be propelled into the material that is to be loaded into the conveyer while the latter is in operation so that the apparatus will cut its way into the material and simultaneously lift the material into a wagon. The fractional drive on the traction wheels prevents severe overloading of the conveyer and revolving scoops as the wheels slip as soon as resistance to forward motion exceeds a certain limit.

The rear wheels 56 are arranged to turn in unison for the purpose of steering the apparatus. The axle of each wheel 56 is provided with a vertical portion 57 revolubly mounted in the frame 11 and having a projecting arm 58. The two arms 58 are connected by a suitable link 59.

For operating the conveyer the sprocket 19 on the shaft 16 is connected by means of a chain 31 to the sprocket 32, which in turn drives the sprocket 33 at the lower end of the conveyer by means of the gear wheels 34 and 35. To the sprocket 33 of the conveyer are connected beveled gears 36 in mesh with the beveled gears 37 on shafts 38. These shafts 38 carry the scoops 39 which move the material to be lifted into the wagon from the sides toward the path of movement of the conveyer.

The conveyer itself consists of two parallel endless chains with buckets arranged across with both ends projecting laterally. Underneath the frame 12 of the conveyer is an apron 60 connected at its upper end to the chute 48. This apron prevents material falling onto the motor and other operating parts of the apparatus.

The scoops revolve in a plane substantially perpendicular to the vertical plane of the conveyer, and the speed of revolution is timed so that successive scoops will deliver the material into successive buckets or to be picked up by successive buckets. The scoops can be used to cut into clay, sand, earth, etc.

In addition to providing means for moving the apparatus along the ground and for operating the conveyer, it is desirable to provide means whereby the angular position of the frame 12 which carries the conveyer 13 can be changed relatively to the main frame 11 of the apparatus. For this purpose the frame 12 is provided with a journal 40 through which passes the shaft 16 which is attached to the frame 11. In order to adjust the position of the frame 12 relatively to the frame 11 a geared segment 41 is provided which is connected to the frame 12 by means of the members 42. The internally arranged teeth of the geared sector 41 are in mesh with a pinion 43 rotated by a worm wheel 44 in engagement with a worm 45. The pinion 43 and worm wheel 44 are rotatably mounted on the axle 27 of the traction wheels 25. The worm 45 is mounted on a shaft 46 provided with a handle 47 by which it can be readily rotated. In this way the angular position of the frame 12 and the conveyer carried thereby can be readily adjusted by hand as required.

The portions of the apparatus required to move the apparatus into engagement with material to be lifted and to operate the lifting conveyer have been described. It has been found desirable, however, to provide means for controlling the discharge of material from the apparatus, and for this purpose the discharge chute 48 is provided with a segmental gate 49 adapted to turn about a pivot 50. This gate is arranged so that it is lifted by the movement of a pair of levers 51 pivoted about the point 52 under the action of counterweights 53 arranged at their other end. For this purpose the gate is provided with a projecting arm 65 adapted to be engaged and lifted by the bar 66 which connects together the two levers 51 whenever the counterweight 53 has a greater turning movement about the shaft 52 than the bag and the parts at the other ends of the levers 51. These counterweights normally hold the levers 51 in such a position that the gate is elevated, but are of such weight and are arranged at such a distance from the fulcrum 52 of the levers 51 that if an empty bag is suspended from the upper end of the levers 51 the effect of the counterweights will be overcome when the bag has been filled with material, so that a filled bag will close the gate 49 and automatically cut off the flow of material as soon as the bag has been filled.

The bags are suspended between the two levers 51 operating in unison by bringing the ears of the bags into engagement with the pins 67, and when the bag is full it automatically falls to the ground level or to an intermediate platform level provided for holding or storing the bags, when the filled bag is removed and an empty bag put in its place. The levers 51 are then released when they rise until they contact with the segmental gate, open the latter and hold it open until the material has filled the bag, when the latter again goes down and the operation is repeated.

Having thus described my invention and illustrated its use, what I claim as new and desire to secure by Letters Patent is:—

1. A wagon loading apparatus comprising, in combination, a conveyer, buckets on said conveyer, a pair of members arranged immediately in front of and to the sides of said conveyer adapted to move transversely with respect to the conveyer and move the material rearwardly with respect to the conveyer and lift it directly into the buckets of the conveyer.

2. A wagon loading apparatus comprising, in combination, a conveyer, buckets on said conveyer, rotating scoops arranged immediately in front of and to each side of said conveyer adapted to move the material rearwardly with respect to the conveyer and lift it directly into the buckets of the conveyer.

3. A wagon loading apparatus, comprising, in combination, a conveyer, rotatable members on each side of the lower end of said conveyer, buckets on said conveyer, projecting members on said rotatable members, and means for driving said conveyer and rotating said rotatable members so that the movement of the said projecting members synchronizes with the movement of the buckets of the conveyer.

In testimony whereof I have hereunto signed my name in the presence of the two subscribing witnesses.

WILLIAM T. JAMES.

Witnesses:
PAUL CARPENTER,
DONALD C. WILLIAMS.